United States Patent [19]
Takahashi

[11] Patent Number: 5,638,353
[45] Date of Patent: Jun. 10, 1997

[54] OPTICAL HEAD DEVICE

[75] Inventor: Jun-ichi Takahashi, Tokyo, Japan

[73] Assignee: NEC Corporation, Japan

[21] Appl. No.: 651,270

[22] Filed: May 23, 1996

[30] Foreign Application Priority Data

May 24, 1995 [JP] Japan .................................. 7-125455

[51] Int. Cl.$^6$ .................. G11B 7/00; G11B 7/135
[52] U.S. Cl. .............. 369/112; 369/44.23; 369/44.37; 369/117; 369/118
[58] Field of Search .................... 369/112, 117, 369/118, 109, 110, 44.23, 44.37; 250/201.5

[56] References Cited

U.S. PATENT DOCUMENTS 5,281,797  1/1994  Tatsuno et al. .................. 250/201.5

FOREIGN PATENT DOCUMENTS

| 0727776 | 8/1996 | European Pat. Off. .......... G11B 7/12 |
| 64-79733 | 3/1989 | Japan ................. G02F 1/33 |
| 4-163732 | 6/1992 | Japan ................. G11B 7/135 |
| 5-120720 | 5/1993 | Japan ................. G11B 7/135 |
| 5144075 | 6/1993 | Japan ................. G11B 7/135 |

OTHER PUBLICATIONS

"DVD/CD" Nikkei Mechanical; 1995.8.7, No. 460; pp. 62–65.

Primary Examiner—Georgia Y. Epps
Assistant Examiner—Kim-Kwok Chu
Attorney, Agent, or Firm—Hayes, Soloway, Hennessey, Grossman & Hage, P.C.

[57] ABSTRACT

An optical head device which has: a light source for projecting laser light; a beam splitter for reflecting the laser light onto an optical disk; an objective for focusing the reflected light on an information recording surface of the optical disk to form a micro spot thereon; an optical detector for receiving a light component transmitted through the beam splitter of light reflected on the information recording surface and converting the light component into an electrical signal; a variable aperture device for varying a diameter of the micro spot according to an external input, the variable aperture device being provided between the beam splitter and the objective; and a variable rotation angle diffraction grating for varying a rotation angle of a sub-beam for tracking of the laser light according to an external input, the variable rotation angle diffraction grating being provided between the light source and the beam splitter.

7 Claims, 7 Drawing Sheets

OPTICAL HEAD DEVICE

FIELD OF THE INVENTION

This invention relates to an optical head device, and more particularly to, an optical head device for reproducing information recorded on an optical disk.

BACKGROUND OF THE INVENTION

A conventional optical head device generally comprises a semiconductor laser as a light source, a diffraction grating for generating three beams from the emitting light emitted of the semiconductor laser, a beam splitter for separating the light incided into two directions, an objective for focusing light on an optical disk and optical detector for converting the inciding light into an electrical signal, wherein a light beam is focused on the optical disk to form a micro spot thereon and a reproduction signal is taken from the reflecting light.

Here, in the optical head device which is to be adapted to a high-density recording medium, the size of a light spot which is projected on the recording medium needs to be reduced. The size of the light spot projected on the recording medium depends on a wavelength $\lambda$ of laser emitting light and a numerical aperture(N.A.) of an objective. Thus, to minimize the size of the light spot, the wavelength $\lambda$ is shortened or N.A. is increased.

Japanese patent application laid-open No.3-163732 discloses an optical head device in which a variable aperture iris on the light path of an objective is provided as means for changing the size of a spot projected on a recording medium. Furthermore, Japanese patent application laid-open No.5-120720 discloses an optical head device in which an objective and an aperture diameter varying means which comprises a liquid crystal device and an analyzer, which are integrated and simultaneously actuated by an objective actuator, are provided to vary the numerical aperture. These optical head device can control the focusing to respond to the variation of the disk surface and can control the tracking to respond to the eccentricity of the disk.

However, in the above conventional optical head devices, the tracking cannot be stably controlled since the location of three beams cannot be controlled to respond to the change of the interval between pit rows due to the change of the recording density of the disk. Namely, when the shape (diameter) of the three beam spots is so different from the shape(width) of the tracking pit, such three beam tracking error detection method cannot provide a correct readout of the tracking error signal.

In addition, none of the conventional optical head device has been designed to control the diameter of the beam spot projected on the pit rows on the disk. Namely, in both the case that a high recording density medium is reproduced and the case that a normal recording density medium is reproduced, the diameter of the projecting spot is constant.

As a result, when an optical head device which is designed to adapt to a normal recording density medium is used to read out a high recording density medium, it cannot read out a correct tracking error signal since a projecting spot may overlap with both of the adjacent pit rows due to the long diameter thereof. Also, when an optical head device which is designed to adapt to a high recording density medium is used to read out a normal recording density medium, it cannot read out a correct tracking error signal since the non-sensing area may occur between pit rows due to the short diameter of the projecting spot.

SUMMARY OF THE INVENTION

Accordingly, it is an object of the invention to provide an optical head device in which a correct readout of the tracking error signal can be obtained.

It is a further object of the invention to provide an optical head device in which a correct readout of the tracking error signal can be obtained regardless of a recording density on a recording medium.

According to the invention, an optical head device, comprises:

a light source for projecting laser light;

a beam splitter for reflecting the laser light onto an optical disk;

an objective for focusing the reflected light on an information recording surface of the optical disk to form a micro spot thereon;

an optical detector for receiving a light component transmitted through the beam splitter of light reflected on the information recording surface and converting the light component into an electrical signal;

a variable aperture device for varying a diameter of the micro spot according to an external input, the variable aperture device being provided between the beam splitter and the objective; and a variable rotation angle diffraction grating for varying a rotation angle of a sub-beam for tracking of the laser light according to an external input, the variable rotation angle diffraction grating being provided between the light source and the beam splitter.

In accordance with the optical head device of the invention, the diameter of a projecting spot formed on an optical disk can be controlled by enlarging or reducing the aperture of the variable aperture device to adapt to a recording density of the optical disk. Therefore, the occurrence of the non-sensing area where a reproducing signal cannot be detected can be prevented.

Furthermore, since three beams can be located to match with the interval of pit rows by the variable rotation angle diffraction grating, a tracking error signal can be stably detected.

BRIEF DESCRIPTION OF THE DRAWINGS

The invention will be explained in more detail in conjunction with the appended drawings, wherein:

FIG. 2(a)–(c) illustrate relations between three beams for tracking error detection and a produced tracking error signal in a conventional optical head device, FIG. 3(a)–(c) illustrate relations between three beams for tracking error detection and a produced tracking error signal in a conventional optical head device, particularly in the case that the readout of the tracking error signal on a disk with normal recording density is conducted by using an optical head device which is designed to adapt to a disk with high recording density.

DESCRIPTION OF THE PREFERRED EMBODIMENTS

Figure 1:
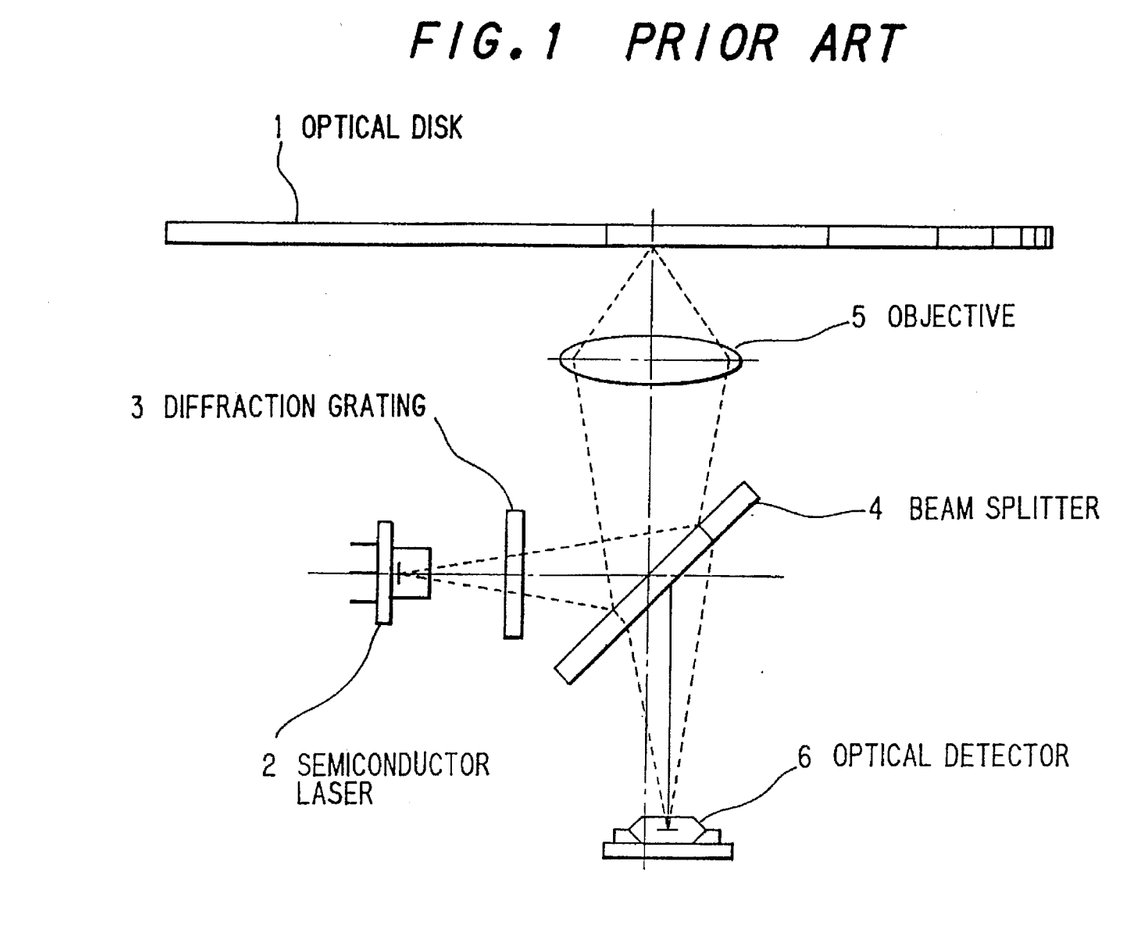
FIG. 1 shows a schematic composition of a conventional optical head device.

Before explaining an optical head device in the preferred embodiment, the aforementioned conventional optical head device will be explained in FIG. 1.

The conventional optical head device comprises a semiconductor laser 2 as a light source, a diffraction grating 3 for generating three beams from the emitting light emitted of the semiconductor laser 2, a beam splitter 4 for separating the inciding light into two directions, an objective 5 for focusing light on an optical disk 1 and optical detector 6 for converting the inciding light into an electrical signal, wherein a light beam is focused on the optical disk 1 to form a micro spot thereon and a reproduction signal is taken from the reflecting light.

In operation, laser light emitted from the semiconductor laser 2 transmits through the diffraction grating 3 to form the three beams for detecting a tracking error signal. The beams are reflected on the beam splitter 4 and then are focused by the objective 5 to form the micro spot on the optical disk 1. The light reflecting on the optical disk 1 transmits through the objective 5 and beam splitter 4 and then incides to the light receiving surface of the optical detector 6 to be converted into an electrical signal. Here, the light reflecting on the optical disk 1 transmits through the objective 5 and beam splitter 4 to generate astigmatism and then is lead to a signal detecting optical system, inciding to the optical detector 6 to produce a focusing error detection signal. The focusing control which responds to the variation of the disk surface can be performed such that a focusing coil is actuated by a focus servo circuit(not shown) to move the objective 5 in the direction of an optical axis.

On the other hand, the rotation position of the diffraction grating 3 is set such that ±1-ordered lights of the three beams formed by the diffraction grating 3 which appear before and behind of central beam( zero-ordered light) locate at the both side tracking pits on the disk. The reflecting light of the ±1-ordered lights transmits through the objective 5 and beam splitter 4 to incide to a light receiving part for tracking error detection of the optical detector to convert them into electrical signals. From the electrical signals, a difference signal is made through a differential amplifier to generate a tracking error detection signal. The tracking control which responds to the eccentricity of the disk can be performed such that a tracking coil is actuated by a tracking servo circuit(not shown) to move the objective 5 in the direction normal to the optical axis.

Figure 2:
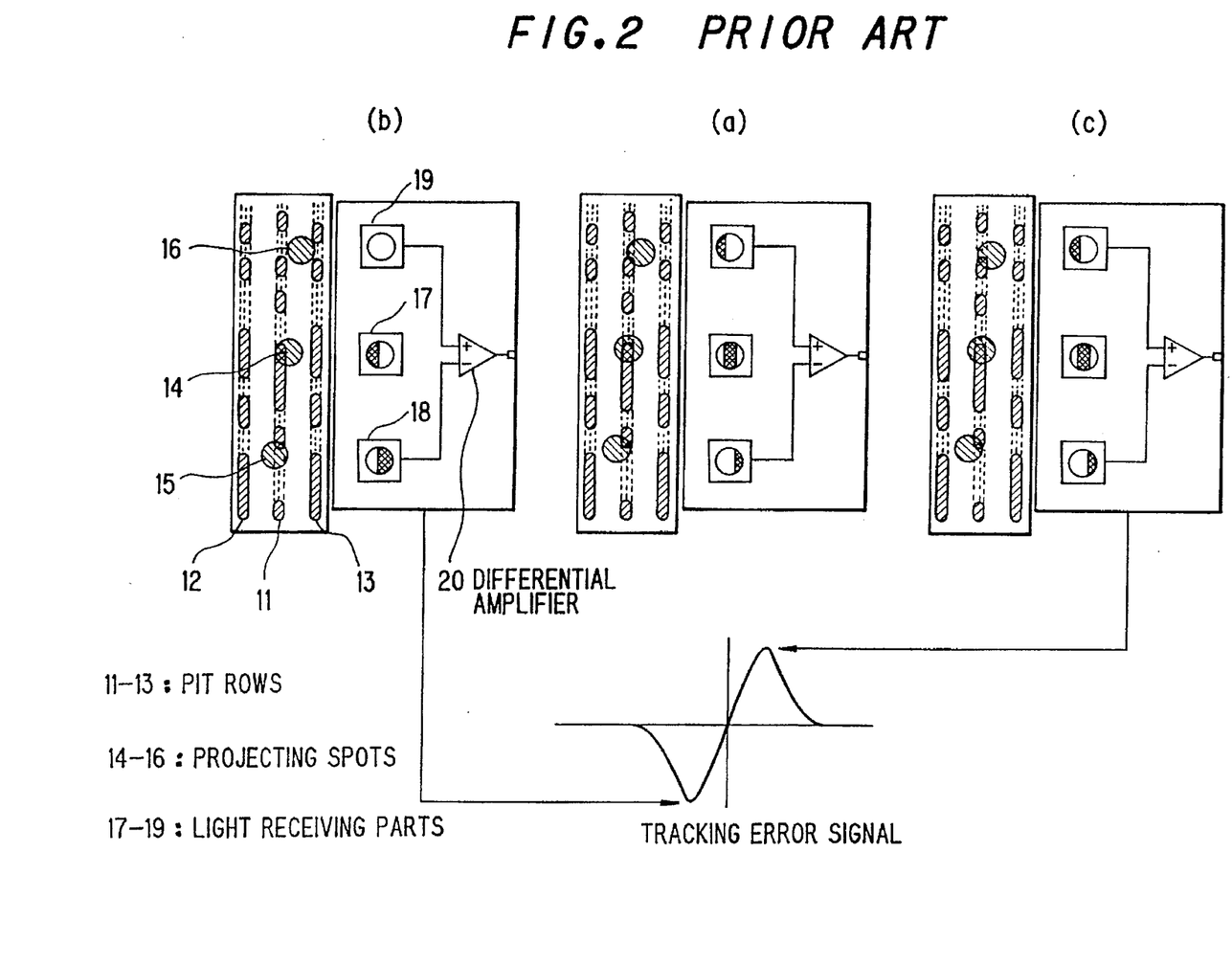

FIG. 2 shows relations between three beams and a tracking error signal in a conventional optical head device, where (a) illustrates "on-track" state, (b) illustrates the state that beams are displaced to the right and (c) illustrates the state that beams are displaced to the left.

In FIG. 2, 11, 12 and 13 are pit rows on a disk, 14, 15 and 16 are projecting spots generated by three beams from laser light, 17, 18 and 19 are light receiving parts corresponding to the three beams and 20 is a differential amplifier.

Here, FIG. 2 shows the case that reproduction is conducted using the optical head device which can respond to a disk with high-density recording capacity by shortening the laser light wavelength $\lambda$ and by increasing the numerical aperture of an objective. Focusing control is conducted by using a focusing error signal obtained from an incidence spot on the light receiving part 17 by the reflection of the projecting spot 14 which corresponds to zero-ordered light in the center of the three beams on the pit row 11. Further, tracking control is conducted by using a tracking error signal produced by the differential amplifier 20 from incidence spots on the light receiving parts 18, 19 by the reflection of the projecting spots 15, 16 which correspond to ±1-ordered lights on the pit rows 12, 13.

As shown in (a) of FIG. 2, in which "on-track" state is illustrated, the incidence spot obtained from the projecting spot 14 is correctly located on the light receiving part 17. In this state, the incidence spots obtained from the projecting spots 15, 16 corresponding to the ±1-ordered lights are equivalently incided on the pit rows 12, 13. Thus, the value of the tracking error signal produced by the differential amplifier 20 is "0".

On the other hand, as shown in (b) of FIG. 2, which illustrates the state that beams are displaced to the right, the intensity of the detection signal at the light receiving part 18 becomes higher and the intensity of the detection signal at the light receiving part 19 becomes lower. As a result, the value of the tracking error signal produced by the differential amplifier 20 becomes minimum. Further, as shown in (c) of FIG. 2, which illustrates the state that beams are displaced to the left, the intensity of the detection signal at the light receiving part 18 becomes lower and the intensity of the detection signal at the light receiving part 19 becomes higher. As a result, the value of the tracking error signal produced by the differential amplifier 20 becomes maximum.

In the case as shown in FIG. 2, the three beams for detecting the tracking error produced by the diffraction grating 3 have a focused spot diameter which match the size of pits on the high recording density disk. Therefore, in the (b) and (c) states that the beams are displaced to the right or left due to the eccentricity of disk, the difference of light intensity between ±1-ordered lights becomes maximum while the value of the tracking error signal in "on-track" state is "0". Namely, as shown to the bottom in FIG. 2, the tracking error signal changes in the form of "S" letter. Since a continuous signal curve with the "S" letter shape can be obtained due to the eccentricity frequency of the disk, the position of the objective can be controlled according to the disk eccentricity.

Figure 3:
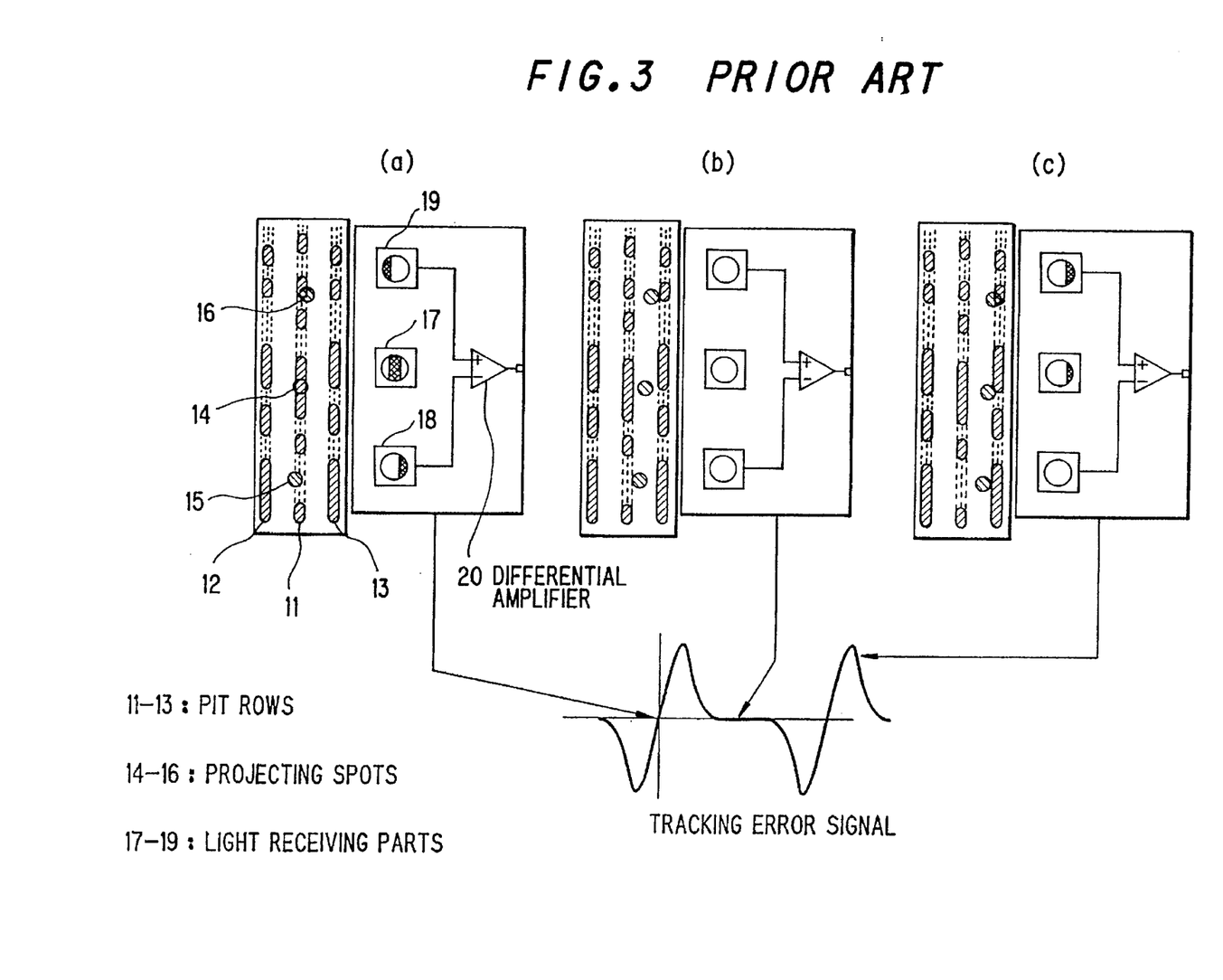

FIG. 3 shows the case that the readout of the tracking error signal on a disk with normal recording density is conducted by using an optical head device which is designed to adapt to a disk with high recording density. In this optical head device, the diameter of projecting spots on the disk is further shortened.

As shown in (a) in FIG. 3, in which "on-track" state is illustrated, the value of the tracking error signal is "0" similarly to the case in FIG. 6. However, also in the case as shown in (b) of FIG. 3, which illustrates the state that beams are completely displaced from tracking pits, the tracking error signal takes the value "0" since none of the projecting spots are overlapped with any pit rows. In addition, as shown in (c) of FIG. 3, which illustrates the state that the beams are further displaced, the tracking error signal takes the maximum value again. In the state that the tracking error signal takes the value "0" even if the beams are completely displaced from the tracking pits, the tracking servo circuit cannot work correctly, thereby causing a failure in the readout of disk information.

Next, an optical head device in the preferred embodiment will be explained in FIGS. 4 to 7, wherein like parts are indicated by like reference numerals as used in FIG. 1.

Figure 4:
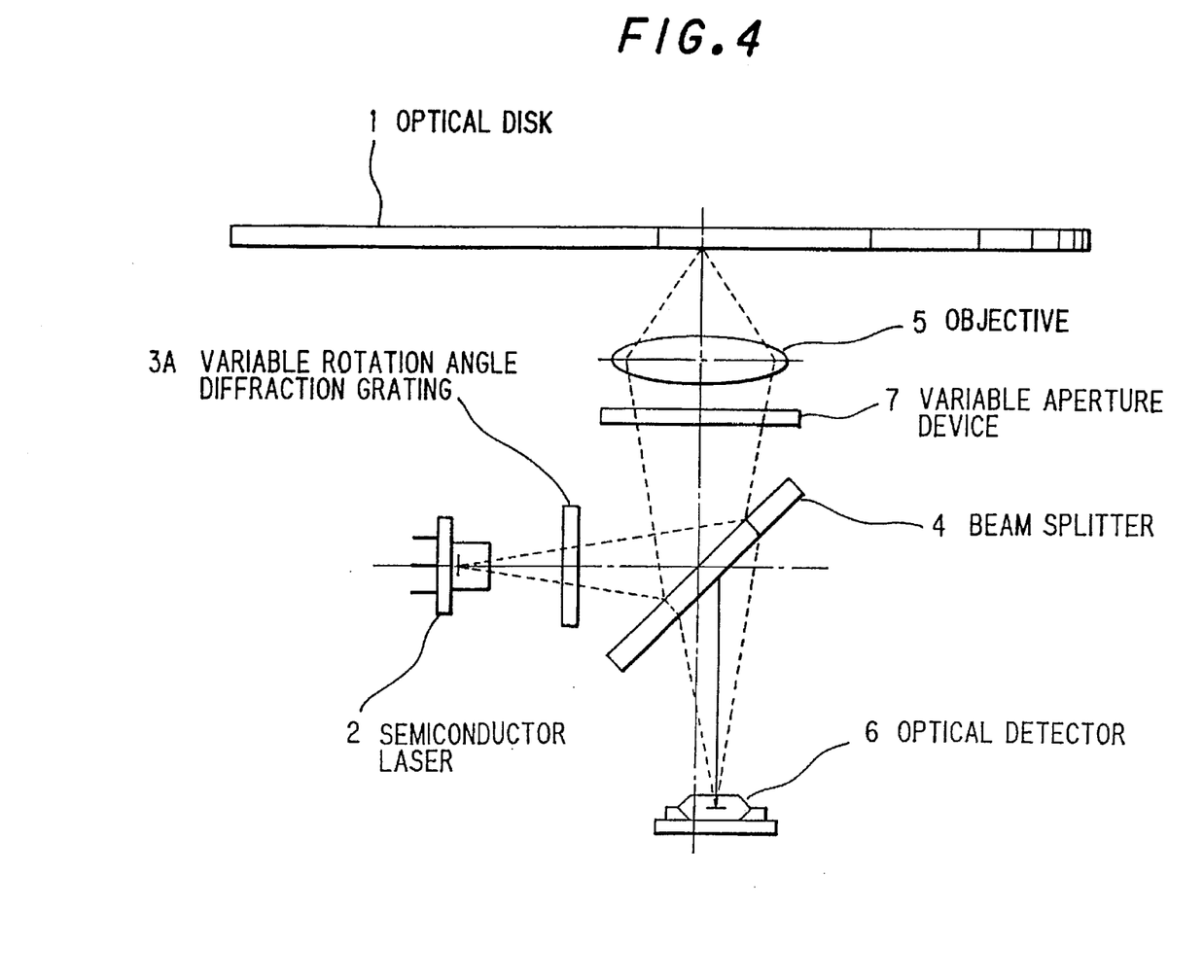
FIG. 4 shows a schematic composition of an optical head device in a preferred embodiment according to the invention.

As shown in FIG. 4, the optical head device in the embodiment further comprises a variable rotation angle diffraction grating 3A and a variable aperture device 7.

In operation, laser light emitted from a semiconductor laser 2 transmits through the variable rotation angle diffraction grating 3A to form three beams for detecting a tracking error signal. The beams are reflected on a reflection mirror 4 which comprises a half mirror or the like( in general, a beam splitter) and then transmit through the variable aperture device 7. The variable aperture device 7 is designed to transmit light through the aperture of an objective 5. The laser light transmitted through the variable aperture device 7 and objective 5 is focused to a micro beam with a size determined by the numerical aperture of the objective 5 to form a micro spot on an optical disk 1. The light reflecting on the optical disk 1 transmits again through the objective 5 and variable aperture device 7 to incide the reflection mirror 4 through which the light transmits with refracting according to Snell's law.

In the light transmitted through the reflection mirror 4, a light component parallel to the plane of FIG. 4 is enlarged and the other component perpendicular to the plane of FIG. 4 is transmitted as it is, thereby causing astigmatism. The focusing error signal is detected using the astigmatism. The light transmitted through the reflection mirror 4 incides to the light receiving surface of an optical detector 6 to be converted into an electrical signal. From the electrical signal, an information reproducing signal, focusing error signal and tracking error signal are desirably detected.

Figure 5:
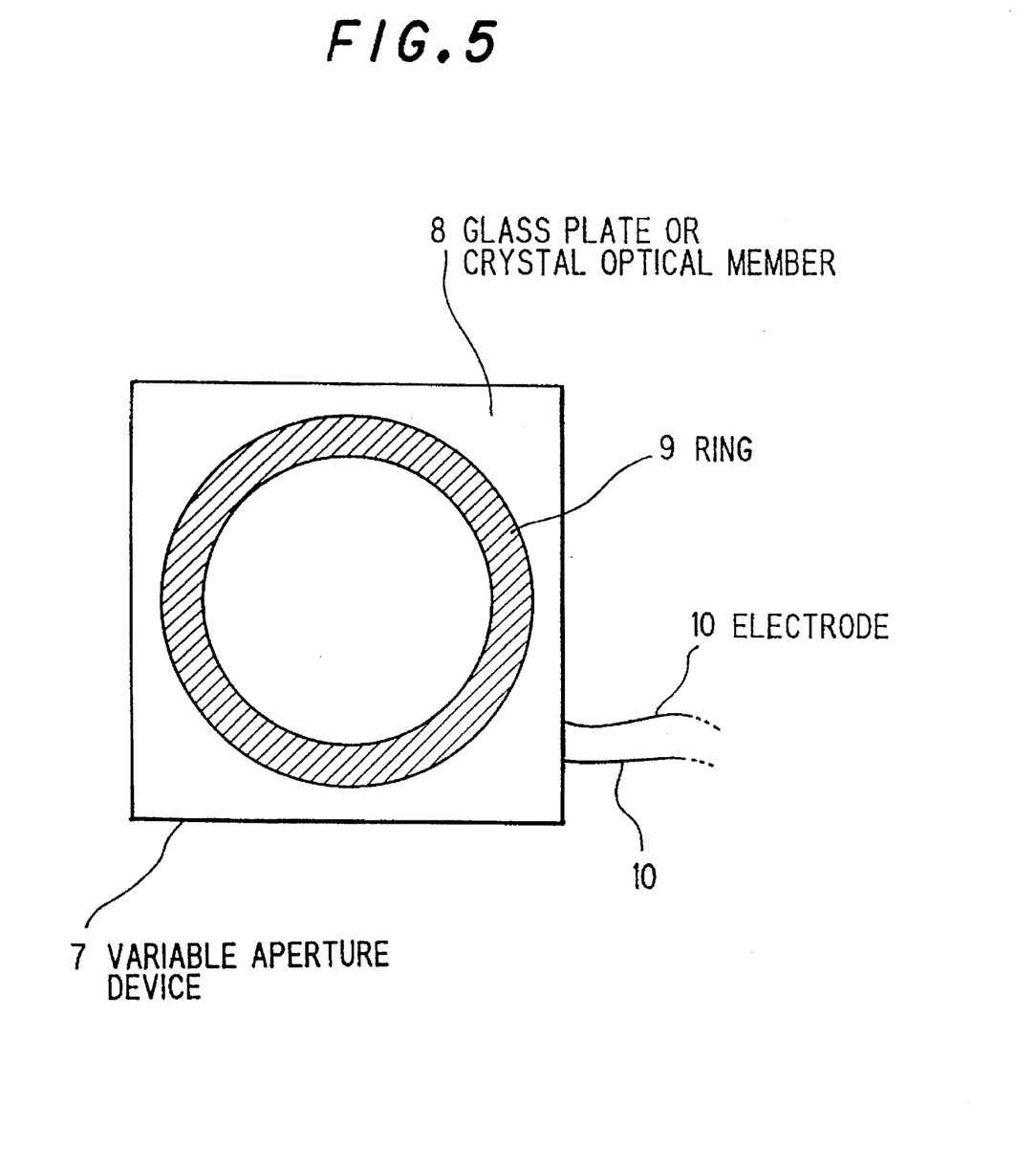
FIG. 5 is a plan view showing a variable aperture device of the optical head device in FIG. 4, FIGS. 6A and 6B show relations between an aperture diameter of an objective and a diameter of a projecting spot on an optical disk.

FIG. 5 shows a structure of the variable aperture device 7. The variable aperture device 7 comprises a glass plate or crystal optical member 8, a ring formed on the glass plate or crystal optical member 8 which comprises an optical device that transmission and interception of light can be controlled and which has a diameter to be matched with the aperture diameter of the objective 5 and electrodes 10 for supplying current with the ring 9.

An example of the optical device that transmission and interception of light can be controlled is an acoustooptic member. When the ring 9 is composed of an acoustooptic member, the transmission and interception of light can be controlled by ON or OFF of the current through the electrodes 10 to enlarge or reduce the transmissible area by polarization to control the aperture diameter of the objective 5. The variable aperture device 7 may be formed integrated with the objective 5.

Figure 6A:
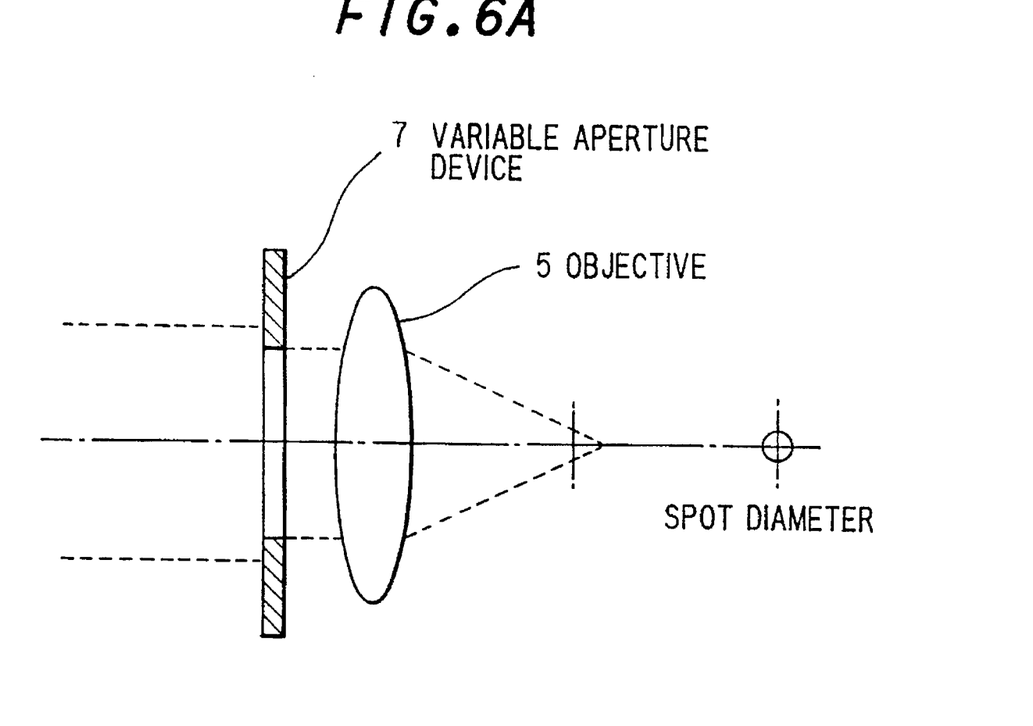
Figure 6B:
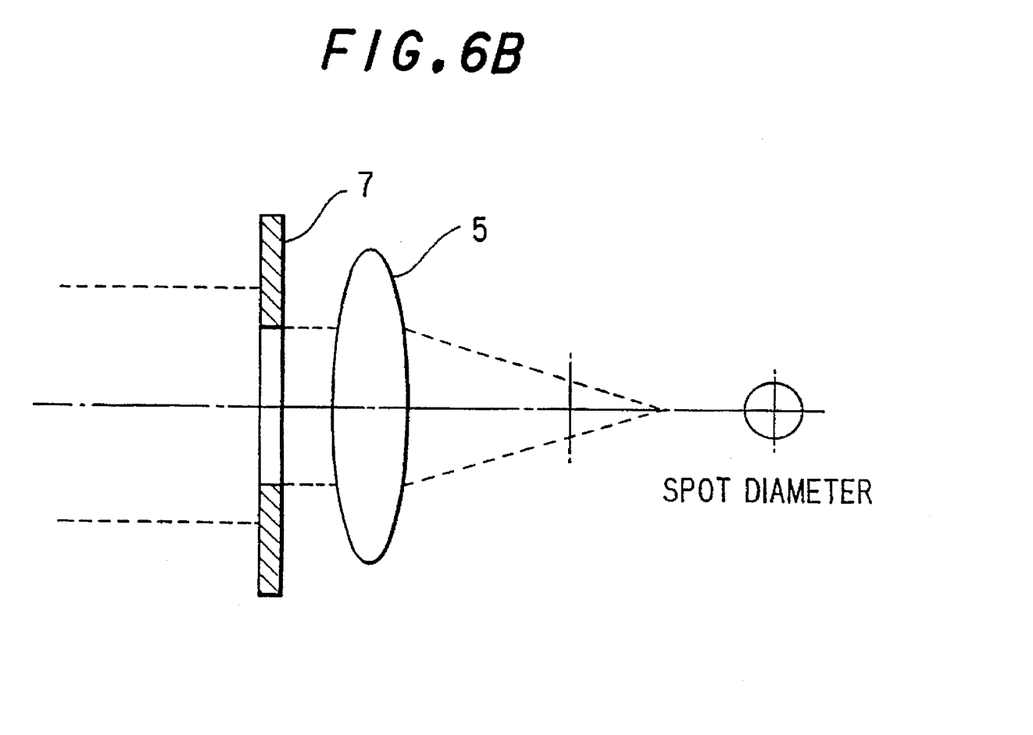

FIGS. 6A and 6B show relations between an aperture diameter of the objective 5 and a diameter of a projecting spot on the optical disk 1. FIG. 6A illustrates a normal aperture and FIG. 6B illustrates a narrowed aperture.

When the aperture diameter of the objective 5 is varied by the variable aperture device 7, incidence light is focused to match with the numerical number of the objective 5. In the normal aperture, as shown in FIG. 6A, the diameter of the projecting spot on the optical disk 1 is short. In the narrowed aperture, even when the objective 5 with the same numerical number is used, the diameter of the projecting spot on the optical disk 1, as shown in FIG. 6B, becomes long as in the case that an objective with a smaller numerical aperture is used.

Figure 7:
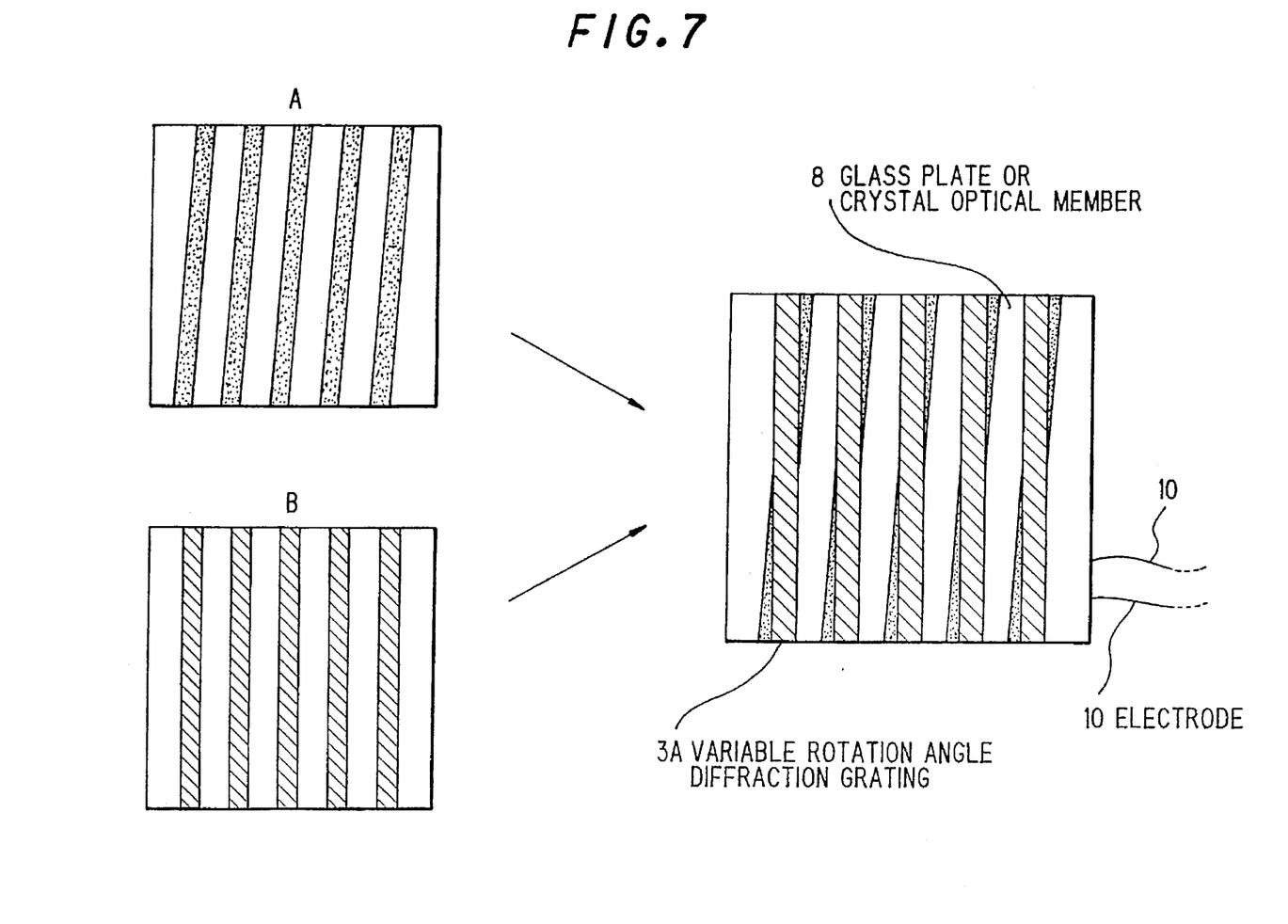
FIG. 7 is a plan view showing a variable rotation angle diffraction grating of the optical head device in FIG. 4.

FIG. 7 shows a structure of the variable rotation angle diffraction grating 3A. The variable rotation angle diffraction grating 3A comprises a glass plate or crystal optical member 8, diffraction gratings A and B composed of acoustooptic members which are formed on the glass plate or crystal optical member 8 and electrodes 10 for supplying current with the diffraction gratings A and B. The rotation angles of diffraction gratings A and B which are previously set to match with the location of the three beams can be selected by conducting current through electrodes 10 to effect either of the diffraction gratings A and B. Thus, by using the variable rotation angle diffraction grating 3A, the location on the optical disk 1 where the three beams are projected can be controlled.

As explained above, in the optical head device of the embodiment, the diameter of a projecting spot formed on an optical disk can be controlled by enlarging or reducing the aperture of the variable aperture device 7 to adapt to a recording density of the optical disk. Therefore, the occurrence of the non-sensing area where a reproducing signal cannot be detected can be prevented.

Furthermore, since three beams can be located to match with the interval of pit rows by the variable rotation angle diffraction grating 3A, a tracking error signal can be stably detected.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head device, comprising:

a light source for projecting laser light;

a beam splitter for reflecting the laser light onto an optical disk;

an objective for focusing said reflected light on an information recording surface of said optical disk to form a micro spot thereon;

an optical detector for receiving a light component transmitted through said beam splitter of light reflected on said information recording surface and converting said light component into an electrical signal;

a variable aperture device for varying a diameter of said micro spot according to an external input, said variable aperture device being provided between said beam splitter and said objective; and a variable rotation angle diffraction grating for varying a rotation angle of a sub-beam for tracking of said laser light according to an external input, said variable rotation angle diffraction grating being provided between said light source and said beam splitter.

2. An optical head device, according to claim 1, wherein:

said variable aperture device is composed of an electrical acoustooptic member or a magnetooptical member.

3. An optical head device, according to claim 2, wherein:

said variable aperture device is composed of a glass plate or crystal optical member on which said electrical acoustooptic member or magnetooptical member for controlling transmission and interception of light is provided.

4. An optical head device, according to claim 1, wherein:

said variable aperture device is integrated with said objective.

5. An optical head device, according to claim 1, wherein:

said variable rotation angle diffraction grating is composed of an electrical acoustooptic member or a magnetooptical member.

6. An optical head device, according to claim 5, wherein:
said variable rotation angle diffraction grating is composed of a glass plate or crystal optical member on which said electrical acoustooptic member or magnetooptical member for varying said rotation angle is provided.

7. An optical head device, according to claim 5, wherein:
said variable rotation angle diffraction grating comprises two or more diffraction gratings which are previously set to match with a location of said sub-beam.

* * * * *